United States Patent
Caidar et al.

(10) Patent No.: US 9,560,416 B2
(45) Date of Patent: *Jan. 31, 2017

(54) METHOD AND APPARATUS FOR INTERFACING BUYERS WITH PRODUCTS DEPICTED IN A VIDEO

(71) Applicants: Allon Caidar, San Diego, CA (US); David Caidar, San Diego, CA (US)

(72) Inventors: Allon Caidar, San Diego, CA (US); David Caidar, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/709,458

(22) Filed: May 11, 2015

(65) Prior Publication Data
US 2016/0066051 A1   Mar. 3, 2016

Related U.S. Application Data

(63) Continuation-in-part of application No. 14/473,942, filed on Aug. 29, 2014, now Pat. No. 9,032,447.

(51) Int. Cl.
| | |
|---|---|
| *H04N 21/478* | (2011.01) |
| *H04N 21/4722* | (2011.01) |
| *H04N 21/431* | (2011.01) |
| *H04N 21/433* | (2011.01) |
| *H04N 21/4402* | (2011.01) |
| *H04N 21/4545* | (2011.01) |
| *H04N 21/81* | (2011.01) |

(52) U.S. Cl.
CPC .... *H04N 21/47815* (2013.01); *H04N 21/4312* (2013.01); *H04N 21/4333* (2013.01); *H04N 21/440263* (2013.01); *H04N 21/440281* (2013.01); *H04N 21/45455* (2013.01); *H04N 21/4722* (2013.01); *H04N 21/47805* (2013.01); *H04N 21/812* (2013.01); *H04N 21/8133* (2013.01)

(58) Field of Classification Search
CPC ............ H04N 21/4725; H04N 21/4622; H04N 21/812; H04N 21/8586; H04N 21/4722; H04N 21/84; H04N 21/854; H04N 21/8543; H04N 21/8547; H04N 21/858; H04N 21/47205; H04N 21/8583; G06F 17/30855; G06F 17/30882; G06F 17/30017; G06F 17/3079
See application file for complete search history.

(56) References Cited

U.S. PATENT DOCUMENTS

| | | | | |
|---|---|---|---|---|
| 7,120,924 B1* | 10/2006 | Katcher | ............ | G06F 17/30855 725/109 |
| 8,065,615 B2* | 11/2011 | Murray | ................. | G06F 3/0481 715/716 |
| 2002/0056136 A1* | 5/2002 | Wistendahl | ....... | G06F 17/30017 725/135 |
| 2010/0145796 A1* | 6/2010 | Berry | ................. | G06Q 30/0251 715/760 |

* cited by examiner

*Primary Examiner* — Hai V Tran
(74) *Attorney, Agent, or Firm* — Donn K. Harms

(57) ABSTRACT

A method for capturing viewer attention concerning a product depicted in a color motion video display is provided wherein one or a chosen sequential plurality of image frames rendering the motion video on a display during a defined time period, includes highlighted portions of the video frame depicting products or services to attract the gaze and attention of the user wherein a provided user interface may be employed to request information about or order the product depicted in the highlighted portion of the display of the video.

6 Claims, 3 Drawing Sheets

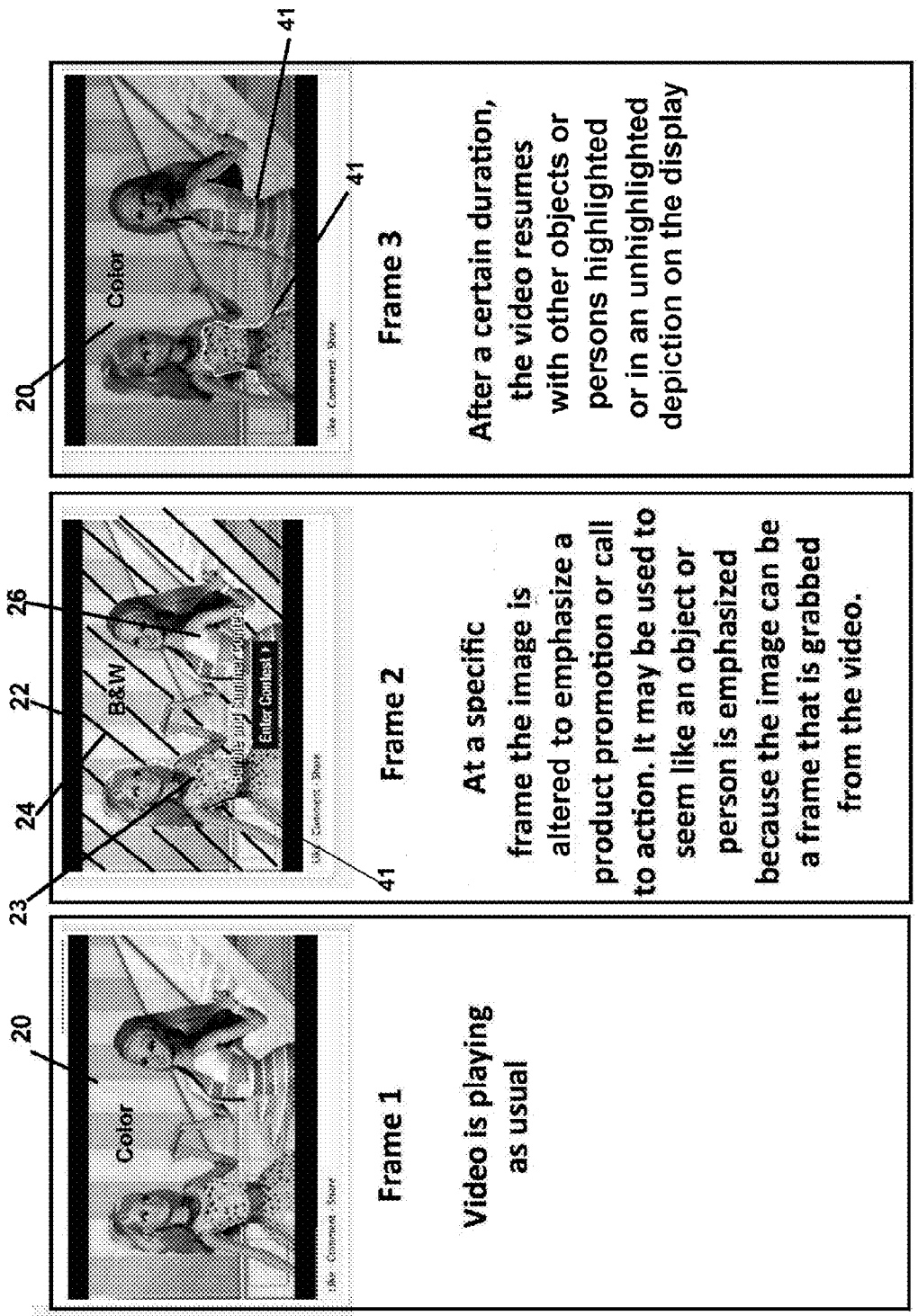

METHOD AND APPARATUS FOR INTERFACING BUYERS WITH PRODUCTS DEPICTED IN A VIDEO

This application is a Continuation in Part application to U.S. patent application Ser. No. 14/473,942 filed on Aug. 29, 2014 and which is included herein in its entirety by this reference thereto.

BACKGROUND OF THE INVENTION

1. Field of the Invention

The invention herein disclosed relates generally to the field of display advertising and sales of products displayed. More particularly it relates to a system whereby a video, movie, commercial, or other remotely viewable entertainment or advertising video of moving video, functions as an advertisement in a manner adapted to catch the user's attention for a product or service in the displayed video, by a highlighting thereof of a particular product depicted in the display, to the attention of the viewing user.

2. Prior Art

Background of the Invention

The marketing of products through television advertisements and internet video and other streaming video to viewers, has become ever more prevalent with the maturing internet and the increasing number of internet and broadcast media channels. This visual marketing has increased exponentially with the advent of smartphones, pad computers, and wireless connections both through WiFi and cellular networks.

In broadcast media, as well as streaming media over the internet, advertisements are conventionally broadcast during intermissions of a broadcast TV show or movie. Additionally advertisements are viewable by users over the Internet on the video screens of computers, as well as on television screens of users having Digital Video Recorders and the like. Such advertisements with the advent of digital recording of broadcast and streaming video, are frequently skipped by the viewer since the advent of digital recording while allowing the users to time shift their viewing, also allows such viewers to fast-forward through or skip such advertisements.

While catalogs and static-photo advertising such as billboards, catalog pages, and display ads online, have been employed modernly to distribute knowledge about product lines and for advertising, the use of videos with commercials having moving actors or stories, is not widely employed for much but making users aware of certain products being advanced by the person or company providing the video.

For instance, video commercials may employ actors to show a product or service and invite users to call or visit retailers thereof. Movies and short entertainment videos have been known to purposely dress actors, or supply actors, with particular products to be viewed on the screen by movie goers and viewers of video to entice customers to seek such products out subsequent to viewing the movie or video. In one noted instance the sales of, "Reese's Pieces" a candy, increased dramatically when shown in the movie "ET." Viewers of the movie sought out the product in stores subsequent to leaving the theaters. The company selling the candy paid a fee for placement of the candy in the movie. However, frequently viewers see such products in a movie or television show or streaming video, and are unable to discern the source and a manner in which to order the product of interest.

The same is currently true for most products displayed in an advertisement video on television or the internet, as well as in feature films or in television programs and series. Viewers seeing a product or service, if purposely made so aware of it by the actors or dialog in the program or movie or tv series, will generally seek out such products and services in stores or online should they find them attractive when made aware initially. Of course there is a lag-time between the viewer being made aware that their favorite athlete drinks a specific drink, or uses specific equipment, or wears particular clothing, and that user's attempt to actually purchase it. Such lag times have been shown to diminish the viewer's initial interest as well as cause viewers to forget their interest when their attention is directed to things other than watching a show or movie.

Of course the viewer's interest in a product or service seen in a movie or other video or other displayed media, but not being advertised or somehow highlighted during the viewing, is passive. This is because the communicated media is not communicated with the intention to entice the viewer of a particular movie or video where a favorite actor may have been wearing designer dress or carrying a particular purse. It is this passive interest and the subsequent lag time in seeking the product or service after the viewer has viewed show or video, which can cause additional loss of interest, or just cause the user to forget their interest until the are reminded again upon viewing the item of interest.

In many cases viewers of video and movies are inattentive or not particularly ascertaining the presence of a particular product in the viewed frame. The viewer may be wrapped up on the plot of the video, or for instance may be talking on the phone while viewing the video display and have divided attention. Thus, even products deliberately placed upon or adjacent actors and in the displayed screens of a video or movie or other motion picture or television show, can easily be missed by potential buyers of such products. This is generally because even though a product is deliberately placed into the scene of the movie or show being displayed to viewers, such products occupy a small portion of the pixels depicting the entire moving depiction on the viewed screen. This small area of depiction, combined with viewer inattention, or viewers focusing attention on the faces or other areas of the displayed video, and the general distractions viewers are constantly subjected to by others in the room, phones texts, more often than not, causes most viewers to miss the purposely placed product in a scene of a movie or show or other media being communicated to a user's video display.

As such their exists a need for a method of depicting products positioned within moving depictions on video displays of media such as television, computer screens, smartphones, and other media-playing devices having display screens, which will immediately capture the attention of potential buyers who may be inattentive. Such a method in addition to capturing viewer attention, should do so in a manner where the viewer becomes educated that a product of interest amongst the rest of the items and people depicted on the screen, can be purchased.

Because viewers habitually skip or fast forward through commercial breaks in modern media, such a system should not interrupt the media such as a movie or video program being displayed to the user, at least for periods of time where the viewer becomes irritated. However, such a system should employ the video display of the media itself, to deliberately draw the interest and gaze of a viewer momentarily, as a means to cause the viewer to become cognizant that a product or service being portrayed on the video display, for the purposes of soliciting interest for sales of the product or an interest in a service or the like.

Such a system should be user friendly and allow even the most inexperienced computer-user, to identify and order products and services to which their attention and gaze is momentarily drawn, in shown in a movie, tv show, video, commercial, or internet communicated video program.

Still further, such a service should be easily provided to the producers of such movies, videos, commercials, and other such viewed media, through an interface that will allow the user or viewer of the products and services to which they have become cognizant, to order or seek more information therefor. Still further, because in the modern internet era, the identity of most users is known or can be known to the media provider, such a system should optionally be capable of discerning the products which may be of particular interest to each to each respective individual viewer and adjusting the displayed video to each screen of such know users to gain that user's attention to products calculated to be of particular interest to that respective viewer based on stored data as to each user's interests and prior purchases.

Finally, in providing the system noted as needed above, such a system should be configured to allow for employment of the user interest highlighting method, during the communication of videos and movies and advertisements, to users across a network such as the internet, a TV cable system, a satellite media provider, a remote server, or using downloaded or other media communicated through the user's computer.

With respect to the above, before explaining at least one preferred embodiment of the method for advertising and sales using viewable media herein in detail or in general, it is to be understood that the invention is not limited in its application to the details of employment and to the arrangement of the components or the steps set forth in the following description or illustrated in the drawings. The various apparatus and methods of the herein disclosed invention for providing a means to cause a user to become cognizant of products and services in media for advertising and sales purposes, is capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other media enhancement employed as a means for causing a viewer to become cognizant of a product or service for advertising and sales thereof. It is important, therefore, that the embodiments, objects and claims herein, be regarded as including such equivalent construction and methodology insofar as they do not depart from the spirit and scope of the present invention.

SUMMARY OF THE INVENTION

The disclosed system herein, provides a method of momentarily gaining user attention and the visual gaze of the user or viewer, for a product or service or other item, within a viewable depiction of such on a video display being viewed by the viewer watching videos, movies, broadcast television, commercials, streaming video, and other digital video media which communicated for display for viewing by viewers. Once viewer attention is gained and a gaze of the viewer toward a particular portion of the viewable video display, and they have been made cognizant of the presence a the product or service, an easy to operate ordering electronic system for purchasing or requesting information concerning the products and services may also be provided in a graphic interface on the screen which may in a favored mode of the system, actually employ the product of interest itself as the icon or link for users to communicate interest in that product.

The system employs software adapted to the task, to alter the video being displayed upon a video display of a user, to cause the pixels of a product or service or depicting all or part of a person or character on the display screen, to momentarily become highly visible, relative to surrounding pixels in the surrounding displayed media on the same video display. This momentary means for rendering a highlighted portion operates as a means to gain the attention and visual gaze of the viewer and thereby causes the viewer to become cognizant of a product or service being currently displayed in the video display of the media. Employing the system herein, even inattentive viewers of the displayed media in experimentation have become attentive to the highlighted portion of the video display and hence the product within that portion of the screen being highlighted.

Video media displayed on a video display as moving pictures such as movies in a theater and on television screen or a display screen of a computer, presents the illusion of motion to the human brain by depicting individual video frames, at a particular number of frames per second. This sequential depiction of individual video frames which slightly change sequentially, is known as frame rate or frame frequency or frames per second (FPS). FPS is the frequency (rate) at which an imaging device, such as a video display or television, produces unique consecutive images called frames on the viewing screen.

The term applies equally well to film and video cameras, computer graphics, and motion capture systems. Frame rate is most often expressed in frames per second (FPS) and is also expressed in progressive scan monitors as hertz (Hz) and more recently in such standards as 24p, 25p, and 30p in digital standards for digital Televisions and movie theaters.

It is known that the human eye and its brain interface, or the human visual system, can generally process 10 to 12 separate individual images per second, in order to perceive each image individually without the perception of motion. It is also known that the threshold of human visual perception, varies depending on what is being measured.

When viewing a lighted video display, people begin to notice a brief interruption of darkness being present, if such darkness persists for about 16 milliseconds or longer. Experiments in recent years have shown that observers can recall one specific image in an unbroken series of different images, where each of which lasts as little as 13 milliseconds. Other experiments in recent years have shown that when given very short single-millisecond visual stimulus on a display, viewers thereof report a perception of such stimulus at a duration of between 100 ms and 400 ms.

Such a perception has been explained as being due to persistence of vision by the cells perceiving the image in the visual cortex as well as by the receptors in the eye being slightly overloaded. This may cause images perceived in this duration, to appear as one stimulus, such as a 10 ms green flash of light immediately followed by a 10 ms red flash of light, being perceived as a single yellow flash of light. It is this visual cortex persistence of vision which may also create an illusion of continuity. This illusion in perception by the human brain allows a perceived sequence of still images on a video display or movie screen, to give the impression of motion. Such a motion perception occurs even when the image is not projected, for example when the pages of cartoon book are thumbed through quickly, and the sequential stationary images thereon appear to move.

Experimentation for this application has shown that when a viewer sees video on a video display which the brain perceives as moving, a short change or delay in the displayed images of a single frame, in which some object or person or part of the displayed frame appears out of context with the previously displayed video images, which were displayed a normal FPS or frames per second, the changes in the single image immediately captures the viewer's attention. Further the above noted persistence of vision in the cells of the eye receptors and visual cortex, makes the out of context image appear for a longer time duration in the brain, than the time for which it was actually displayed.

Additionally, because the human eye has a very narrow focus for objects and things in the central area of vision, a separate channel of communication from the eye to the brain has developed to process images moving in the periphery of what is being viewed by he user. An example of such is when a person is talking with another person, and out of the corner of their eye, they perceive a moving object, which causes them to look in that direction. This separate but generally acute perception of motion peripherally is believed to have developed over time as a defense mechanism that is hard-wired to the human brain. Perceived peripheral movement causes an instant attention shift from what is being viewed in a central area of vision, to a glance as to what is perceived as moving or could be a threat in the peripheral vision.

Experimentation has found that this hard-wired reaction by the brain to a transmitted image from peripheral sight can also be employed, to shift the focus of an inattentive viewer of video being displayed, or a distracted viewer such as a person talking on the telephone while watching television. This shift of focus causes the inattentive viewer to shift their focus of attention and the gaze by their central vision, directly to the video screen.

The method herein, by delaying the timing of a frame of the video being depicted from the normal FPS, and/or also changing the coloration or the size or the brightness or depicted outline of a particular person or product or thing in the perceived frame of the displayed video, will cause a human watching the display screen directly, or indirectly with peripheral vision, to immediately respond to the unexpected change in context of the area of the display, by focusing their gaze and central vision. Thus, a majority of their attention, is focused upon what is being depicted on the display which is out of context in color, speed, brightness, timing, sized, or outline, to the rest of the frame being depicted.

As noted, this change in what the brain perceives as normal and expected or unthreatening, as a threat response or as just a shift in focus promoted by the change in FPS and other contextual frame factors, is a hard-wired response in the brain. Thus, it will momentarily capture the visual gaze and the direct attention of attentive viewers or inattentive viewers who have the display centrally positioned in their view, or where the display is in the periphery of their view.

Further, due to the above noted persistence of vision in the visual cortex, the out of context area of the displayed image is perceived as being displayed longer, and with the viewers attention focused thereon, the highlighting of the pixels depicting a product or object, or person, in the displayed media out of context in time and display factors, from the previous perceived moving display and current surrounding display areas, is perceived and remembered.

Additionally, because the brain of the viewer will immediately focus on what is perceived as out of the ordinary or expected in displayed media on a video display, and because in most instances it elicits an alerting response, the viewer's reflexes are momentarily focused to react to what is perceived as "changed" in the displayed frame, from the previous and surrounding areas of current displayed frames, which were perceived as movement. This reflex once elicited by the method herein, may continue to be employed to allow the user the choice to continue to maintain the frame displayed on the screen using an available control. Thereafter they can be provided means to actually order or seek more information on the perceived product or object or person, by employment of a provided available graphic interface.

For instance by momentarily stopping the FPS of images, with a delayed single frame or plurality of frames, or continuing the depiction at a normal rate with a dulling or changing background depicted pixels to grayscale, behind a known actor wearing clothing or carrying a purse which is maintained in the same colorization as the previous frames, the visual "memory" of color perceived by the color receptors of the eye, will see what remains in proper colorization as normal. Concurrently due to what is best described as overload in the color receptors of the eye for previously perceived colors in the now grayscale area, the viewer will actually see in their brain, a momentary negative color image for what is now shown grayscale.

Further, if an area of pixels on the screen displayed depicting a product is slightly enlarged and/or highlighted relative to the previous size and non highlighted state of the area of pixels, this same gaze and attention gain of the viewer occurs. Essentially the brain cognition of the viewer being used-to and expecting a continuation in the size and highlighting or colorization of the depicted portion of the pixels of the display screen, will specifically notice that portion which goes out of context with the previous and ongoing surrounding areas of the depiction on the video display. Such captures their gaze and thus their immediate attention.

This change to the surrounding colorization relative to the item or object in the highlighted portion of the screen to the viewer, to take advantage of negative color communicated from color eye receptors to the brain, provides a means to place the out of context and highlight of the depicted product or image in the delayed frame presented to the viewer, to instantly focus the viewer's gaze and attention on a highlighted portion of the display is being shown in out of context with the surrounding areas. Such can be surrounding normal colorization, and rendering the area of interest brighter or with a highlighted outline, or being rendered slightly brighter than a grayscale background, or slightly larger than in previous frames rendering the highlighted portion.

Thus, with the viewer in alert due to changes in what was previously perceived as normal, and given a means to activate or employ a graphic interface with what is depicted in the delayed frame in color, enlarged size or other highlighted portion mode, and additionally being presented with added indicia on the display screen with or to seek information or pricing, and using the highlighted portion or area or a provided graphic button to activate to order, the user may purchase the product, object, or service being highlighted in their perception, or request more information thereon.

If the viewer chooses to employ the graphic interface option during the period of display of the video with the area of pixels depicted in the aforementioned manner for mentally highlighting a portion of the screen rendering the product or service, then the ongoing program or video being shown on their display screen may temporarily cease while the transaction is completed.

Once interaction by the viewer ceases through completing an ordering or information request process, or using a depicted graphic interface to terminate the process, or a duration of time, the program or video or other media depicted on the display, which in the interim has been ported to electronic memory, will again begin to run normally. Such steps will be initiated and provided by software running on a computer which is adapted to the task of changing the displayed context of the viewed media, and then providing the user highlighted item or items and the interface to order, seek information, or to continue normally with the displayed media.

This method for altering the context of displayed video relating to a product or service relative to surrounding displayed video and/or previous frames displayed of the media and achieving viewer attention for a product or service or object or person displayed during an ongoing depiction communicated to a video display by delaying a frame thereof during the normal FPS depiction, or continuing the normal FPS, but visually highlighting pixels in a portion or area of the display to focus the viewer attention, can be repeated during programs or streaming video or even entire movies or other video media watched by viewers. Further, unlike many videos which have timed portions where advertisements replace or overlay the media of interest to the user, and give the viewer no option but to watch the ad for a determined duration, the system herein uses the video media itself as the advertisement and does not overlay or replace the video of interest to the user with unrequested advertising. Such of course minimizes viewer frustration which overlay screens cause by continuing the media or video the user as decided to depict on their video display.

In operation, software running in the background and generating the video images depicted on the screen of the viewer, will maintain in electronic memory, the fixed or moving location of the outline of those pixels and the pixels inside the outline, as well as any screen area of pixels providing the user interface for action, and will only operate to provide ordering or information based on resulting viewer actions. Such an action subsequent to an input by the viewer of interest, can be to either pause the frames being displayed while an order is placed or terminated, or, once a determined amount of time for the display of a delayed single frame has elapsed, after a user input of interest, the software will cause the communication of displayed frames of video to the viewer video display screen at a normal rate and colorization and object size to be perceived as motion pictures to the brain of the user.

In a simple mode of the device and method, the user interface to order or inquire may operate by providing for the employment of pointing device to place a cursor on the perceived highlighted portion of the display rendering a product, service, person, or other matter sought to be communicated to the viewer as available, and the viewer allowed to activate by employing the cursor in a position to start the software routing for ordering or requesting information.

As noted the icon or button or area of pixels for user input to communicate interest can also be the highlighted portion rendering the item or service, may be the highlighted portion itself. During the routine, indica may be added to the display giving instructions or providing the user a target for the cursor activation to complete the process.

The operator of the system herein, would have a secure server in communication with the viewer's media recording device and/or display and computing interface, to provide the user the ability to operate the cursor or other onscreen designator which may be employed by the viewer. Subscribing advertisers to the operator of the system, may be provided user orders or requests for information from their employment of the interface depicted on the delayed frame on the viewer's video display, and may then provide the product, service, information, or other matter requested by the viewer.

Alternatively, the viewer may be directed to and connected by the server, to the subscribing advertiser's ordering site, wherein video depictions with a graphic interface will be communicated to the viewer's video display for completion of the order or request process by the viewer.

Still further, as noted above, when the user is known to the system provider who has a relational database on each user's interests based on previous ordering, internet searches, or other user-specific data, the system herein can employ the software operating to alter the video depicted upon each user's screen to only highlight portions thereof having products determined through the relational data on that user to be of interest to that user.

With respect to the above description, before explaining at least one preferred embodiment of the method of focusing viewers of displayed media on a portion of the screen to elicit interest or ordering using a provided graphic interface, allowing viewers to employ the graphic interface to buy or receive information about a product or service, it is to be understood that the invention is not limited in its application to the details of operation nor the arrangement of the components or steps set forth in the following description or illustrations in the drawings. The various methods of implementation and operation of the method herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of methods and systems for carrying out the several purposes of the present method to perceive products or services during a paused video frame, and act thereon. Therefore, that the objects and claims herein should be regarded as including such equivalent construction, steps, and methodology insofar as they do not depart from the spirit and scope of the present invention.

Further objectives of this invention will be brought out in the following part of the specification wherein detailed description is for the purpose of fully disclosing the invention without placing limitations thereon.

It is an object of this invention to provide a method for capturing the attention and visual gaze of viewers of displayed media momentarily to give them the option of employing a graphic interface to continue a process of ordering or requesting information concerning a product or service.

It is another object of this invention to provide such a system which will alter the video displayed for a short duration with frames which has been altered for color and/or brightness and or size in areas of pixelization, to cause the viewer to immediately focus on a provider-highlighted pixel area portion to interest the viewer.

It is another object of this invention, to provide a graphic interface employable by the viewer if they so choose during the depiction of the single frame for an elongated time period.

These together with other objects and advantages which become subsequently apparent reside in the details of the construction and operation of the system herein as more fully hereinafter described and claimed, reference being had to the accompanying drawings forming a part thereof, wherein like numerals refer to like parts throughout.

BRIEF DESCRIPTION OF DRAWING FIGURE

FIG. 2 is a depiction of displayed media on a viewing screen of a viewer being presented at a normal frame per second rate in continuous colorization of pixels on all areas of the display.

FIG. 3 shows the single frame of the system herein, being shown for a delayed period of time, with the striped are representing areas of the display altered for color and/or brightness and/or size (such as zooming into a portion) and out of context from that of previous frames, with areas desired to focus viewer's attention appearing normal or appropriately colored, relative to the previous frames presented.

Figure 1:
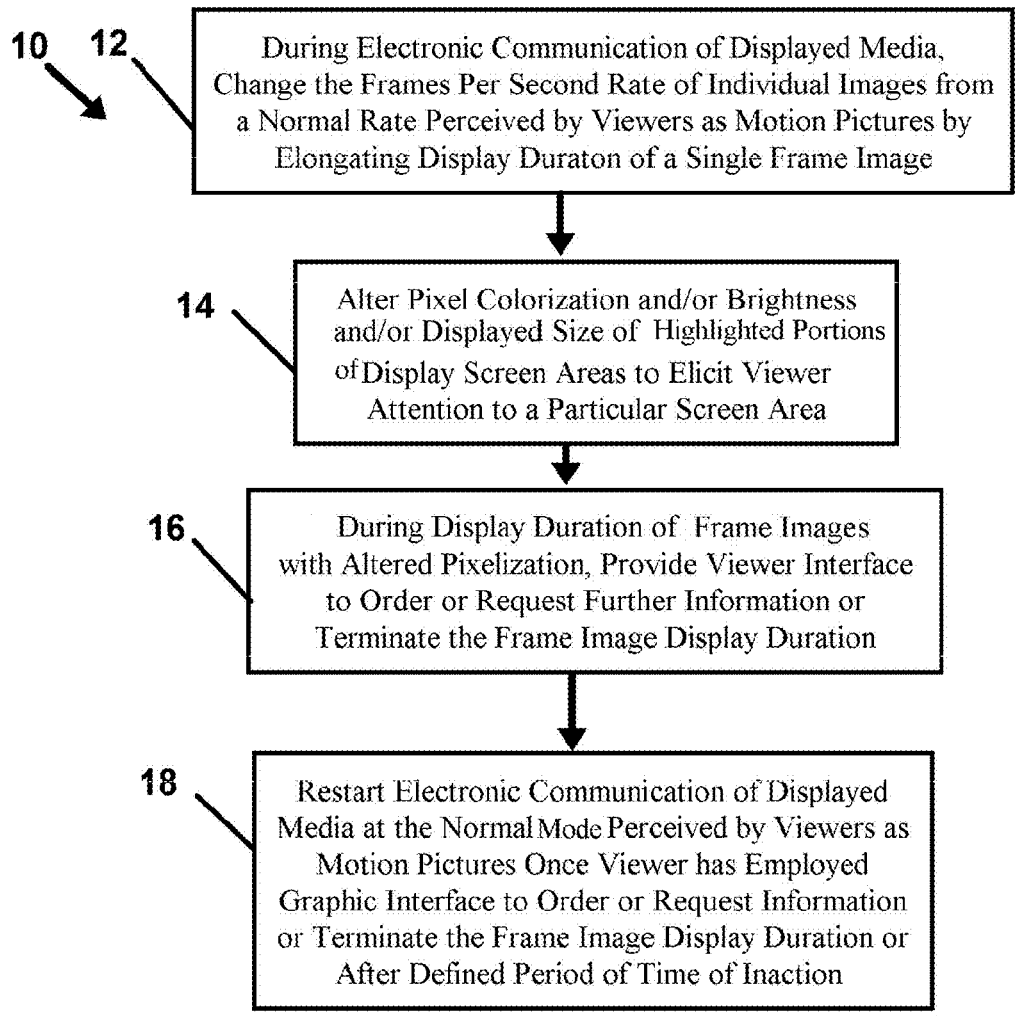
FIG. 1 shows a flow chart of the method and system herein.

FIG. 4 depicts the displayed media proceeding at a normal frame per second rate in the same colorization of all pixels as that of FIG. 1 but with objects in a highlighted portion.

Figure 5:
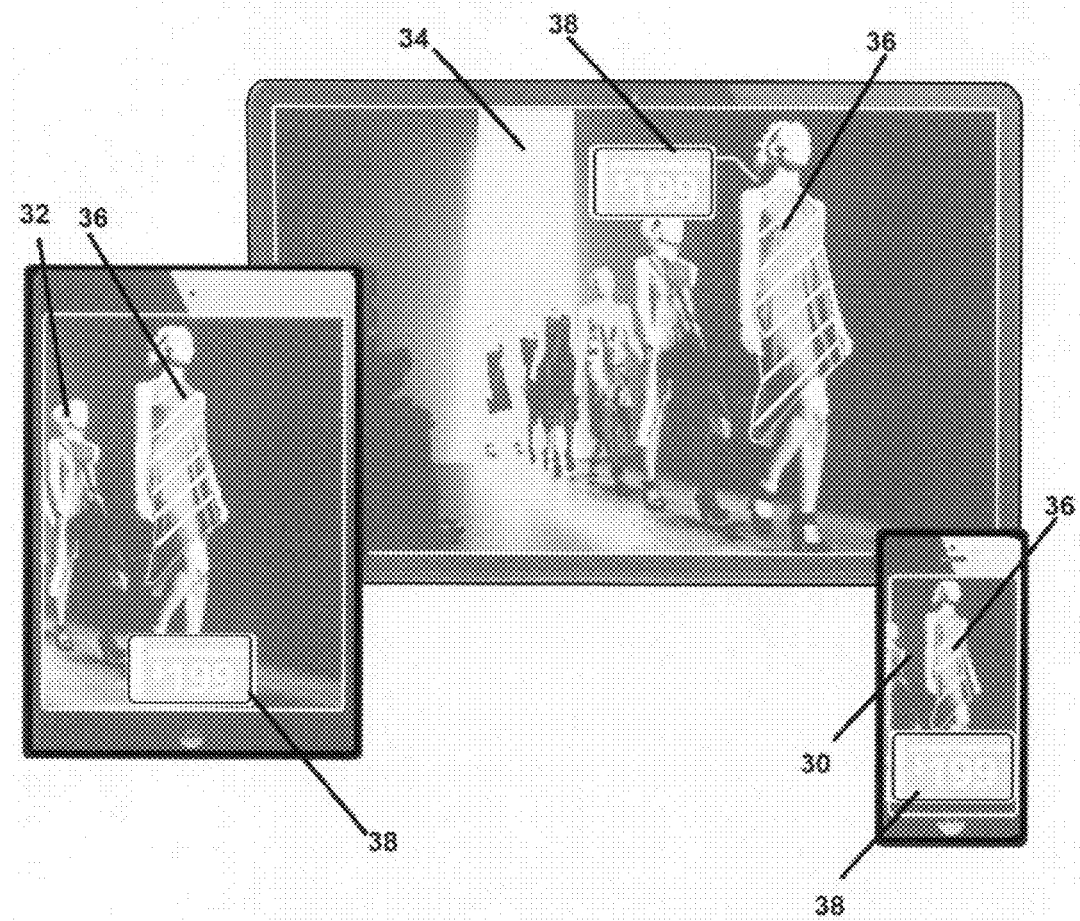

FIG. 5 shows the delayed frame of displayed media of the system being presented on any video display screen with a computer interface such as a smart phone, pad or laptop computer, or smart TV with the striped portion indicating the area depicted to attract viewer attention.

DETAILED DESCRIPTION OF THE
PREFERRED EMBODIMENTS OF THE
INVENTION

Referring now to the method and system herein shown in simple format by the depictions of FIGS. 1-5, FIG. 1 depicts a flow chart of the method of the system 10 herein, in a preferred mode of the system 10.

In a first step 12, during the electronic communication of the data configured to generate the frames per second of displayed media on a user display screen as motion at a normal rate between 20 to 30 frames per second, the frames per second rate of the individual images may be changed from this normal rate perceived by viewers as motion or moving pictures. This change in frame rate is accomplished by elongating a display duration of a single frame image to a time frame from one half a second to ten seconds, as a means to elicit the attention-getting response of the viewer to a perceived change in motion or colorization or other pixel highlighting features.

In a next step 14, during the frame rate change, the single frame being displayed to the viewer is altered in context from the immediately preceding frames viewed by altering one or a combination of pixel colorization, brightness, or the displayed size of the frame itself to zoom to an area, as a means to elicit a focusing of viewer attention by the perceived change from the display of media of the previous screen. As noted, the reflex reaction of the eyes where previous colored pixels on the display are immediately changed to grayscale, has been found in experimentation to cause a negative version of the image of the previous colors to be communicated to the brain. By maintaining the same colors in areas of the displayed image to that of previous images, the viewer sees that image normally, but surrounded by the momentarily negative image in the grayscale areas surrounding the highlighted portion of the depicted image or series of images, which the service provider wishes to focus the viewer's attention upon for paying subscribing advertisers.

Additionally, the area of interest or highlighted portion rendered in normal colorization can optionally be an image zoomed or enlarged slightly from the size of the previous images in the perceived motion picture of the viewer, to make the area of pixels seem to rise above the screen relative to the grayscale areas appearing momentarily in negative color and the area to be focused for interest appearing to be surrounded by such. Such may be accomplished by slightly increasing the size of the object or by applying a highlight line or glow to the perimeter of the object in the highlighted portion to render it to the viewer to appear slightly larger, even if moving at normal FPS. It should be noted that reversing this process by leaving the background in normal color, and making the product or service highlight to grayscale, did not have the same effect when tested on viewers and did not work nearly as well as the grayscale surrounding pixels and normal colorization of the area of the screen where the product or service of interest is positioned.

In a subsequent step 16, during the time duration of the single frame image which is longer than that of normal frames per second imaging perceived by the viewer as motion pictures, or during a time of depiction of a chosen plurality of images shown with a highlighted portion, the viewer may be provided a graphic interface which may be communicated to the display screen of the viewer in a networked communication from the server of the system provider which is running software adapted to this communication. This graphic interface may also be employed for use to allow the user to order or request further information or terminate the duration of the depicted frame image, which as noted has been altered to focus user attention on a product or service or person or other matter.

In a further step, 18, the system provider of the communicated displayed media, will employ software adapted to the task and running on the server or a computer in communication therewith, to restart the electronic communication of the displayed media causing the normal rate of individual frames per second perceived by viewers as motion pictures once the viewer has employed the graphic interface to order or request information or indicated a wish to terminate the frame image display duration. Alternatively software running on the provider's server or a connected computer or on the device of the viewer communicating the video depictions to the video display can terminate the frame image display duration after a defined period of time of inaction by a viewer.

FIG. 2, displays an example of normal displayed media 20 on a video display screen. In normal operation thereof, a viewer is presented at a normal frame per second rate, in continuous colorization of pixels within all areas of the display with no highlighted portion.

Shown in FIG. 3 is a single frame 22 of the system herein, which may be shown for an elongated period of time relative to the normal frames per second of displayed media 20 of FIG. 2, or, which may be sequentially displayed frames of the media depicted on the video display for a chosen period of time with the highlighted portion 23 depicted. The striped area 24 depicts un-highlighted areas of the display altered for color which are changed to grayscale or otherwise altered to render the highlighted portion 23.

Other alternations of the displayed media to form a highlighted portion 23 rendering the object or objects which are to catch the attention of the using viewer can include changes in brightness and/or size (such as zooming into the highlighted portion 23 or slightly enlarging the object depicted by the highlighted portion 23) for the duration of display thereof from that of previous frames of the areas on which to direct viewer's attention 26, and/or also rendering them to appear normal or appropriately colored, relative to the previous frames presented of displayed media 20 but brighter, or larger, or having a perimeter 41 edge which is brighter or appears to glow rendering the object larger in a highlighted screen portion. By highlighting the object in a portion of the depicted video to attract the user's gaze and attention through the above, the video or movie or TV show or other media itself, can become the advertisement. The viewer is of course after viewing a few segments of such media with highlighted portions of the screen rendering objects of interest, educated to know that the objects appearing in highlighted portions through the above modes of highlighting, are available for sale or more information. In such a mode, the object itself, with slight or significant highlighting in the portion of the screen it occupies, especially if slightly enlarged or surrounded by highlighting which slightly enlarges it, may be used as the input icon or button or position for the user to land a cursor and activate the interface to allow purchase or information requests.

FIG. 4 depicts the displayed media 20 proceeding at a normal frame per second rate in the same colorization of all pixels as that of FIG. 2 during ongoing highlighted rendering of the first portion of each of the plurality of sequentially displayed color image frames, from its size of the objects being presented to the user with highlighted portions in the above noted modes or by adding a highlighting line to all or portions of the perimeter 41 edge of the object which renders it slightly larger to the view of the user and attracts their gaze and attention.

FIG. 3 absent the highlighting perimeter 41 or objects, would provide the user with an unaltered media image once the viewer completes a presented process using a graphic interface, or a time period for display of the frame of FIG. 3 elapses. Thus, if the mode of highlighting of FIG. 3 is employed the imaging may return to un highlighted objects, however if colorization and FPS is to remain in continuity with the rest of the movie or show or other visual media, then the object may be for a time highlighted in the aforementioned fashions of color, brightness, and size from surrounding pixels in the image.

FIG. 5 shows the delayed frame of displayed media of the system being presented on any video display screen with a computer interface such as a smart phone 30, pad or laptop computer 32, or smart TV 34. The striped portion 36 indicates the area of the displayed video which defines the highlighted portion, in any of the above noted modes to be depicted to attract viewer attention in the fashion noted above relative to surrounding media pixels. Also shown are the graphic interface area 38 of indicia which allows the user to employ a pointing device or cursor control device to order or request information or terminate the image delay or to terminate the highlighting of the object or object in where there is no delay in the presented imaging to the viewer but where the viewer wishes to proceed without highlighting the object or objects in the movie, tv show, streaming media, or other visually depicted media.

Finally, as noted above, the objects or persons chosen for highlighting for each respective viewer during the presented video of a movie, tv show, streaming media, or other displayed video, can be customized to each respective viewer. As noted with a network connection of the media device it may be ascertained who the user is, and from stored databases relating to that individual user in a cloud or connected to the service provider, the object or objects or persons chosen for highlighting in the aforementioned fashion, may be chosen as objects discerned from the database of interests of that user, which appear in the media being viewed, or in some instances the objects themselves may be customized to that viewer's known interests. Such would cause the viewer to alert and notice specific objects or persons or things highlighted which of particular interest to them thereby allowing them to seek purchase or more information on such.

While all of the fundamental characteristics and features of the system for allowing capturing a viewer's attention and allow ordering or requesting information concerning products or services during a displayed media perceived as motion pictures, has been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A method of capturing viewer attention concerning a product depicted in a color motion video comprised of a plurality of sequentially displayed color image frames displayed on a video display at a rate of between 15 to 60 frames per second, comprising the steps of:

displaying for a duration of time of display, a chosen plurality of sequentially displayed color image frames rendering a first portion of each of said chosen plurality of image frames, which depicts a product or service, as a highlighted rendering thereof;

during said duration of time of display of displaying said highlighted rendering, enlarging only said first portion of each of said chosen plurality of sequentially displayed color image frames, from its size in an immediately previously displayed image frame displayed on said video display, prior to a beginning of said duration of time of display, for said duration of time of display during said duration time of display, rendering a second portion of said chosen plurality of image frames, adjacent to or surrounding said first portion, un-highlighted;

during said duration of time of display, depicting a graphic interface on said display is being operated to allow said viewer to input a signal indicating an interest in said product or service depicted within said highlighted rendering of said first portion of each of said chosen plurality of image frames;

if a said signal is input, communicating to said viewer a graphic interface providing a means to request information or purchase said product or surface; and if said signal is not input, upon cessation of said duration of time of display, resuming said motion video comprised said plurality of sequentially displayed color image frames.

2. The method of claim 1, wherein said highlighted rendering comprises altering pixel coloration or brightness of said first portion, relative to that of said second portion, during all or part of said duration of time of display thereof.

3. The method of claim 2 wherein graphic interface depicted on said display is being operated to allow said viewer to input a signal indicating an interest in said product or service, comprises said first portion of each of said plurality of sequentially displayed color image frames during said duration of time of display.

4. The method of claim 2 wherein said enlarging of only said first portion of each of said chosen plurality of sequentially displayed color images is accomplished by highlighting a perimeter edge of said first portion thereby rendering it larger.

5. The method of claim 1 wherein graphic interface depicted on said display is being operated to allow said viewer to input a signal indicating an interest in said product or service, comprises said first portion of each of said plurality of sequentially displayed color image frames during said duration of time of display.

6. The method of claim 1 wherein said enlarging of only said first portion of each of said chosen plurality of sequentially displayed color images is accomplished by highlighting a perimeter edge of said first portion thereby rendering it larger.

* * * * *